3,352,802
RIGID RETICULATED STRUCTURE AND METHOD OF USE THEREOF
William R. Powers, Penns Grove, N.J., assignor to Scott Paper Company, Philadelphia, Pa., a corporation of Pennsylvania
No Drawing. Filed Feb. 28, 1964, Ser. No. 348,298
4 Claims. (Cl. 260—2.5)

This invention relates to a novel and fast method of producing rigid, reticulated bodies. More particularly, this invention relates to a method of producing reticulated polymeric polyvinyl foams by leeching out the plasticizers used in producing the foams, thereby obtaining a rigid or a semi-rigid polymeric structure especially suitable for filtering applications involving acid- or alkali-bearing fluids and previously requiring excessive frame supports.

Prior art polyvinyl foams have generally been produced by dispersing a powder such as polyvinylchloride in a liquid which solvates the powder at a suitably elevated temperature. Then, after expansion by mechanical frothing or by an action of a chemical blowing agent the resultant mobile froth is caused to set to an immobile foam by the application of heat to a temperature which causes gelation of the polyvinylchloride (PVC) in the dispersing liquid. Stabilizers, such as dibasic lead carbonate, are often added to improve thermal stability during processing.

Although the foam produced in this manner is open celled (intercommunicating), the majority of the celled faces are covered by thin membranes or obstructed by strand protrusions. Additionally, the polyvinylchloride invariably has a skin which is of considerable toughness, resembling leather, which must be removed before the strand network becomes exposed.

Prior art attempts to remove the cell walls from the polyvinylchloride have failed. Most of the commonly-known agents capable of attacking polyvinyl foams have attacked the foam body without the desired removal of the membranes. As a general rule, the foams treated by such agents have resulted in a substantially deteriorated material not suitable for industrial applications.

While rigid polyvinyl foams have been obtained by very slowly leeching out the plasticizer, the permeability of any fluid has been negligible because of the skin effect and the limited number of open intercommunicating cells in the foam structure. These foams, while rigid, have failed to yield the desired fluid permeability structures especially resistant to acids and alkalis.

It has now been found that by employing a process for treating polyvinyl foams by explosion techniques and subsequently treating the reticulated foam, suitable rigid polyvinyl filtering structures may be produced.

By means of the process available now, especially suitable rigid polyvinyl structures adaptable as filters may be produced at a considerable saving in production time and especially heretofore unachieved service life in acid and alkali filtering.

The explosion technique named above has produced a considerably more permeable polyvinylchloride structure. Moreover, the explosive flame front generated in the polyvinyl foam produces a certain glazing effect, smoothing the vinyl surfaces, and thereby further enhancing the fluid flow per given thickness and area.

If the polyvinyl foam is repeatedly subjected to the explosion reticulation, the permeability of the foam may be varied in such a manner that fluid-contacting structures of varying performances may be obtained from an identical polyvinyl material. Additionally, it has been found that the reticulated polyvinyl structure may be immeasurably more easily permeated with the leeching liquid and the plasticizer removed from said structure.

Obviously, the same structure is also adaptable for easy drying, allowing the removal of leeching liquid at a commercially attractive rate.

The present invention is achieved by subjecting a polyvinyl foam structure to an explosive flame front, permeating said structure with a liquid capable of removing the plasticizer in said structure and repeatedly circulating said liquid throughout the foam body to leech out the plasticizer.

Polyvinyl foams are generaly made from vinyl halogens, such as, vinylchlorides, vinylbromide, vinyl fluorides, etc.

Other polyvinyls coming within the scope of the invention are vinyl acetates, and some of the higher homologs thereof. Mixtures of the vinyl monomers are often used to produce the foam bodies; for example, vinyl chloride and vinyl acetate. Suitable leeching agents are those capable of removing the plasticizer from the foam body. Each foam manufacturer generally tends to incorporate various plasticizers in various amounts to obtain the best flexibility properties under diverse conditions. For this reason, the leeching agents should be varied to obtain the best rigidity desired. Suitable leeching agents are the halogenated hydrocarbons. However, if a single leeching agent, such as methylene chloride, is sufficient to remove the plasticizer, then mixtures of agents would be superfluous. Generally, those leeching agents capable of simple recovery are preferred. Running the contaminated leeching agent through a still, and removing the plasticizer afterwards, also allows a more economic operation of the whole system.

Rigid polyvinylchloride structures of this invention are especially suitable for filters employed in gas and liquid contacting of fluids bearing acids or alkalis. This chemical property of polyvinylchloride makes the product suitable for use in severe corrosive environments. Additionally, the rigid polyvinyl foam may be used as a packing material in towers in place of Raschig rings or other packing material. Polyurethane foams may also be used for packing purposes separately or in conjunction with the rigid vinyl structures.

The following example is included to illustrate the invention. It is to be construed with reference to the above discussion and claims and is not intended to limit the broader scope of the invention.

*Example*

Polyvinylchloride foam containing didecyl phthalate as a plasticizer or dispersing liquid for the polyvinylchloride is reticulated by filling the void space of the foam structure with a suitable detonating gas mixture of 27% acetylene and 73% oxygen (by volume). The permeated foam structure is then ignited by causing an explosion resulting in a high-temperature flame front propagating throughout the foam. The result is a reticulated structure wherein the membranes covering the pores are melted or vaporized. Repeating the above experiment results in a more permeable foam. The flexible reticulated structure is then washed repeatedly with a methylene chloride to remove the dispersing liquid leaving a reticulated rigid polyvinylchloride article. The structure is then easily dried by passing warm air through it to remove the residual leeching agent.

Other gases suitable for reticulating the polyvinylchloride are methane, ethane, propane, ethylene and dimethylether. In practicing the invention, the fuel gas is admixed with air enriched by oxygen. No composition of fuel gas and air has been found which would give an explosive force capable of reticulating the polyvinylchloride foam.

Polyvinylchloride foam prepared by the above method, when compared with a reticulated polyester polyurethane foam, resists caustic or acid attack heretofore unachieved with polyurethane foams.

What is claimed is:

1. A process for producing a rigid, reticulated polyvinyl foam body, comprising the steps of: permeating a body of plasticized vinyl halide polymer foam containing a large number of cell membranes with an explosive gas selected from the group consisting of acetylene, methane, ethane, propane, ethylene and dimethylether and oxygen-enriched air, igniting said gas mixture and thereby propagating a flame front through said body to remove said cell membranes and produce a reticulated polyvinyl foam, removing said plasticizer by contacting the reticulated body with a fluid capable of leeching said plasticizer from said reticulated foam body.

2. The process set forth in claim 1 wherein the polyvinyl foam is a polyvinyl halide.

3. The process set forth in claim 1 wherein the explosive gas mixture is comprised of acetylene and oxygen.

4. The process set forth in claim 1 wherein said plasticizer remover is methylene chloride.

References Cited

UNITED STATES PATENTS

| 3,124,547 | 3/1964 | Meltzer et al. | 260—2.5 |
| 3,228,896 | 1/1966 | Canterino et al. | 260—2.5 |

GEORGE F. LESMES, *Primary Examiner.*

M. TILLMAN, *Examiner.*

M. FOELAKE, *Assistant Examiner.*